(12) United States Patent
Kanuganti et al.

(10) Patent No.: US 9,646,295 B1
(45) Date of Patent: May 9, 2017

(54) HANDSFREE POINT-OF-SALE

(71) Applicants: Suman Kanuganti, San Diego, CA (US); Yuja Chang, San Diego, CA (US)

(72) Inventors: Suman Kanuganti, San Diego, CA (US); Yuja Chang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/334,841

(22) Filed: Jul. 18, 2014

(51) Int. Cl.
*G06Q 20/32* (2012.01)
*G06Q 20/20* (2012.01)

(52) U.S. Cl.
CPC ......... *G06Q 20/202* (2013.01); *G06Q 20/322* (2013.01); *G06Q 20/325* (2013.01)

(58) Field of Classification Search
CPC .................................................... G06Q 20/202
USPC ...................................................... 705/15, 16
See application file for complete search history.

(56) References Cited

U.S. PATENT DOCUMENTS

| 7,110,963 B2* | 9/2006 | Negreiro | 705/15 |
| 8,515,574 B2* | 8/2013 | Studor et al. | 700/231 |
| 8,756,106 B2* | 6/2014 | Baril | G06Q 20/204 |
| | | | 705/15 |
| 2005/0015256 A1* | 1/2005 | Kargman | 704/272 |
| 2013/0232017 A1* | 9/2013 | Nathanel et al. | 705/16 |
| 2014/0242918 A1* | 8/2014 | Weissman | H01Q 3/26 |
| | | | 455/67.14 |
| 2015/0058021 A1* | 2/2015 | Min | H04R 1/083 |
| | | | 704/275 |
| 2015/0278926 A1* | 10/2015 | Fang | G06Q 50/12 |
| | | | 705/15 |

* cited by examiner

*Primary Examiner* — Scott Zare
(74) *Attorney, Agent, or Firm* — Osha Liang LLP (57) ABSTRACT

A system for performing a point-of-sale (POS) transaction. The system includes a POS device configured to receive an item order input specifying an item that is listed in a pre-determined inventory list of a merchant, receive a hands-free confirmation that the item is to be purchased by a customer, and prompt, in response to the hands-free confirmation, the customer to select a payment method, and a wearable device worn by the merchant and configured to obtain the hands-free confirmation from the merchant for sending to the POS device, and obtain, in response to the prompting, information associated with a payment credential of the consumer for sending to the POS device, where the POS transaction is performed based on the payment credential.

17 Claims, 9 Drawing Sheets

HANDSFREE POINT-OF-SALE

BACKGROUND

Many merchants, such as small business owners of food trucks, farmers market stands, mom-and-pop stores, to-go food shops, etc., have no dedicated staff or have limited staff to handle customer payments. As a result, merchants often have to stop what they are doing, such as handling food in order to take credit card payments from customers. A typical process is:

1. Stop preparing food
2. Take off the gloves
3. Take credit cards from customers
4. Swipe each credit card using a card reader
5. Wait until each transaction is complete
6. Put gloves back on and continue handling food Point-of-Sale (POS) software and hardware are available that adapt merchants' smart phones and tablet computers into credit card acceptance devices. Mobile wallet solutions are also available that configure consumers' smart phones into payment instruments. Many of these solutions rely on special hardware capabilities, such as near field communication (NFC®) or require tight integration between the consumer payment instrument and merchant payment acceptance device.

Handsfree is an adjective describing equipment that can be used without the use of hands (for example, via voice commands) or, in a wider sense, equipment which needs only limited use of hands, or for which the controls are positioned so that the hands are able to occupy themselves with another task (such as driving) without needing to hunt far afield for the controls.

SUMMARY

In general, in one aspect, the invention relates to a system for performing a point-of-sale (POS) transaction. The system includes a POS device configured to receive an item order input specifying an item that is listed in a pre-determined inventory list of a merchant, receive a hands-free confirmation that the item is to be purchased by a customer, and prompt, in response to the hands-free confirmation, the customer to select a payment method, and a wearable device worn by the merchant and configured to obtain the hands-free confirmation from the merchant for sending to the POS device, and obtain, in response to the prompting, information associated with a payment credential of the consumer for sending to the POS device, where the POS transaction is performed based on the payment credential.

In general, in one aspect, the invention relates to a method for performing a point-of-sale (POS) transaction. The method includes receiving, by a POS device, an item order input specifying an item that is listed in a pre-determined inventory list of a merchant, receiving, by the POS device from a wearable device worn by the merchant, a hands-free confirmation that the item is to be purchased by a customer, prompting, by the POS device and in response to the hands-free confirmation, the customer to select a payment method, and obtaining, by the wearable device and in response to the prompting, information associated with a payment credential of the consumer for sending to the POS device, where the POS transaction is performed based on the payment credential.

In general, in one aspect, the invention relates to a non-transitory computer readable medium storing instructions for performing a point-of-sale (POS) transaction. The instructions, when executed by a computer processor, include functionality for receiving, by a POS device, an item order input specifying an item that is listed in a pre-determined inventory list of a merchant, receiving, by the POS device from a wearable device worn by the merchant, a hands-free confirmation that the item is to be purchased by a customer, prompting, by the POS device and in response to the hands-free confirmation, the customer to select a payment method, and obtaining, by the wearable device and in response to the prompting, information associated with a payment credential of the consumer for sending to the POS device, where the POS transaction is performed based on the payment credential.

Other aspects of the invention will be apparent from the following transaction description and the appended claims.

BRIEF DESCRIPTION OF DRAWINGS

FIGS. 2.1, 2.2, and 2.3 show method flow charts in accordance with one or more embodiments of the invention.

FIGS. 3.1, 3.2, 3.3, 3.4, and 3.5 show an example in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed transaction description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the transaction description.

In general, embodiments of the invention provide a method, system, and computer readable medium that facilitates small business merchants to complete point-of-sale (POS) transactions without a dedicated staff for accepting and processing payments.

Figure 1:
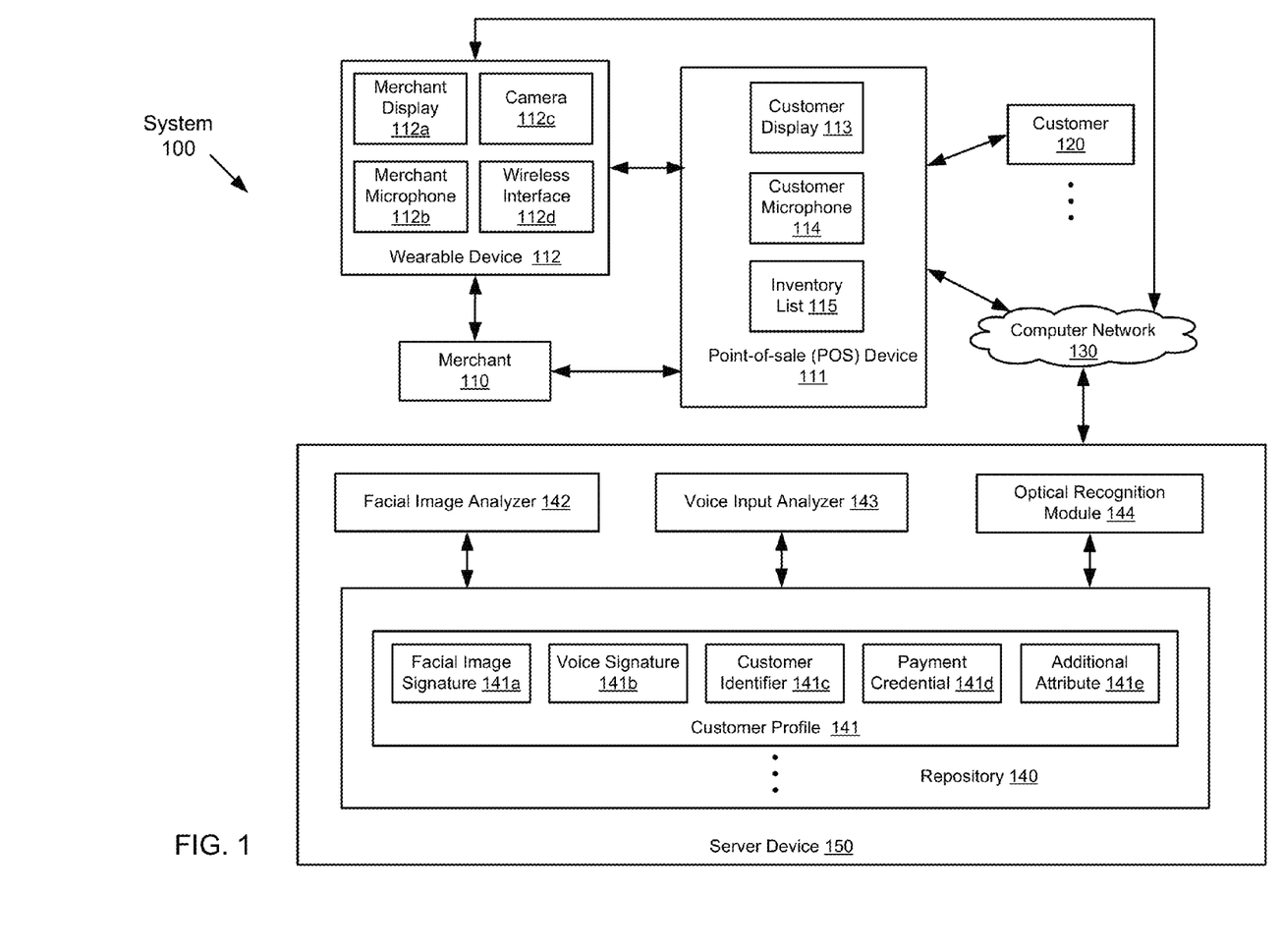
FIG. 1 shows a block diagram of a system in accordance with one or more embodiments of the invention.

FIG. 1 shows a block diagram of a system (100) in accordance with one or more embodiments of the invention. Specifically, the system (100) includes customers (e.g., customer (120)) ordering merchandise items from a merchant (110), a wearable device (112) worn by the merchant (110) for communicating to a point-of-sale (POS) device (111), and a server device (150) accessible by the POS device (111) via a computer network (130). Further, the server device (150) includes a facial image analyzer (142), a voice input analyzer (143), an optical recognition module, and a repository (140) storing customer profiles (e.g., customer profile (141)) of the customers (e.g., customer (120)). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, the customer (120) is an individual consumer who purchases goods and/or services from merchants, such as the merchant (110). In one or more embodiments of the invention, the merchant (110) is a person engaged in the trade of goods, services, or both to consumers. In one or more embodiments, the merchant (110) has a storefront located in at least one physical location. For example, the customer (120) may purchase goods and/or services from the merchant (110) by way of a sales transaction that is performed using a POS (e.g., POS device (111)) device in the storefront and referred to as POS transaction.

In one or more embodiments of the invention, the wearable device (112) is a mobile device worn by the merchant (120). In other words, the wearable device (112) is attached to the body or clothing of the merchant (120) in a handsfree manner. In particular, the wearable device (112) includes hardware and software components that are configured with computing and communication capabilities. Specifically, the wearable device (112) communicates with the POS device (111) or accesses the computer network (130) using the wireless interface (112d) based on a wireless communication protocol, such as Bluetooth®, Wi-Fi®, NFC®, etc. As shown in FIG. 1, the wearable device (112) further includes a display module (i.e., merchant display (112a)) and a voice input module (i.e., merchant microphone (112b)) allowing the merchant (110) to interact with the POS device (111) or to access the computer network (130) in the handsfree manner. In addition, the wearable device (112) further includes a camera (112c) to capture an image of an object (e.g., the face or credit card of the customer (120)) as controlled by the merchant (110). In one or more embodiments, the image is captured in real time during the POS transaction, and is referred to as a just-in-time image. An example of the wearable device (112) is Google Glass®, which is a wearable computer with an optical head-mounted display. Wearers of Google Glass® communicate with coupled devices or access the Internet via natural language voice commands.

In one or more embodiments of the invention, the POS device (111) is a device used by the merchant (110) for the sale of goods. A traditional POS device includes functionality to process purchases, scan product codes for the identification of items, and perform other functions related to the sale of goods. For example, the traditional POS device may include a card reader (e.g., credit/debit card reader), a bar code reader, a receipt printer, an inventory scanner (e.g., RFID, Bar Code, Quick Response (QR) codes/matrix barcodes, etc.), a pin pad, computer system(s), and other devices. In one or more embodiments, a portion, or all of the components of the traditional POS device is eliminated and functionally replaced by the wearable device (112). For example, the scanner component of the traditional POS device is replaced by the camera (112c) of the wearable device (112). In one or more embodiments, the POS device (111) is a tablet computer or a smartphone of the merchant (110) that includes a customer display (113) and a customer microphone (114), allowing customers (e.g., customer (120)) to interact with the POS device (111) for completing the POS transaction. In addition, the POS device (111) includes an inventory list (115) that defines items offered by the merchant (110) and the associated prices of such items.

In one or more embodiments of the invention, the computer network (130) may include a cellular phone network, a wide area network, a local area network, a public switched telephone network (PSTN), a financial network, any other suitable network that facilitates the exchange of information from one part of the network to another, or a combination thereof. In one or more embodiments, the computer network (130) is coupled to, or overlaps with, the Internet.

In one or more embodiments of the invention, the server device (150) is a computing device having hardware and software components, such as: facial image analyzer (142), voice input analyzer (143), optical recognition module (144), and repository (140). In one or more embodiments, the server device (150) is configured to store information associated with the customers in a customer database, as well as to perform various analysis of information associated with the customers. For example, the information associated with the customers may be organized in the repository (140) as customer profiles of individual customers, such as the customer profile (141) of the customer (120). In one or more embodiments, the repository (140) may include: a disk drive storage device, a semiconductor storage device, a database management system, other suitable computer data storage device, or combinations thereof. In one or more embodiments, content stored in the repository (140) may be: a data file, a linked list, a data sequence, a database, a graphical representation, or any other suitable data structure. In one or more embodiments, the customer profile (141) includes: facial image signature (141a), voice signature (141b), customer identifier (141c), payment credential (141d), and additional attribute (141e). In particular, the facial image signature (141a) corresponds to data representing facial features of the customer (120) and may be generated from one or more facial images of the customer (120). The voice signature (141b) corresponds to data representing voice features of the customer (120) and may be generated from one or more voice utterances of the customer (120). The customer identifier (141) may be a unique identifier assigned by the server device (150) to identify the customer (120) for indexing profile information of the customer (120). The payment credential (141d) may include information (e.g., account number, card number, pin number, security code, password, etc.) associated with credit card, debit card, or other financial accounts of the customer (120). For example, the customer (120) may have electronic wallet or electronic payment network account that are uniquely identified based on a mobile phone number or email address of the customer (120). Accordingly, the payment credential (141d) may include such mobile phone number or email address, as well as associated password and/or other authentication data items. The additional attribute (141e) may include other personal information of the customer (120), such as frequently purchased items, favorite sport teams, loyal customer discount, etc.

In one or more embodiments, the server device (150) includes the optical recognition module (144) that is configured to receive and analyze a payment card image of the customer (120) to extract payment credential from the payment card image. Specifically, the payment card image of the customer (120) is captured by the merchant (110) using the camera (112c) of the wearable device (112) and sent to the server device (150) via the POS device (111). In one or more embodiments, the optical recognition module (144) uses optical recognition technique to extract the payment credential from the payment card image. Once extracted, the payment credential is returned by the server device (150) to the POS device (111) to process the POS transaction for the customer (120). In one or more embodiments, the payment credential is returned by the server device (150) to the wearable device (112) via the POS device (111), and the wearable device (112) processes the POS transaction for the customer (120).

In one or more embodiments, the server device (150) includes the facial image analyzer (142) that is configured to receive and analyze a facial image of the customer (120) to identify the corresponding customer profile (i.e., customer profile (141)) in the customer database stored in the repository (140). Specifically, the facial image of the customer (120) is captured by the merchant (110) using the camera (112c) of the wearable device (112) and sent to the server device (150) via the POS device (111). In one or more embodiments, the facial image analyzer (142) compares the received facial image to facial image signatures stored in one or more customer profiles of the customer database to determine a match. For example, the facial image analyzer (142) determines that the received facial image matches the facial image signature (141a) and identifies the customer profile (141) as belonging to the customer (120). In other words, the facial image analyzer (142) associates the customer identifier (141c) with the customer (120) based on the facial image/signature match. Accordingly, other information in the customer profile (141) may be provided to the POS device (111) to facilitate the POS transaction for the customer (120).

In one or more embodiments of the invention, the server device (150) includes the voice input analyzer (143) that is configured to receive and analyze a voice input from the customer (120) in order to identify the corresponding customer profile (i.e., customer profile (141)) in the customer database stored in the repository (140). Specifically, the voice input of the customer (120) is captured by the POS device (111) and sent to the server device (150). In one or more embodiments, the voice input analyzer (143) compares the received voice input to voice signatures stored in one or more customer profiles of the customer database to determine a match. For example, the voice input analyzer (143) determines that the received voice input matches the voice signature (141b) and identifies the customer profile (141) as belonging to the customer (120). In other words, the voice input analyzer (143) associates the customer identifier (141c) with the customer (120) based on the voice input/signature match. Accordingly, other information in the customer profile (141) may be provided to the POS device (111) to facilitate the POS transaction for the customer (120).

In one or more embodiments, the customer (120) is collectively identified, using the facial image, the voice input, or a combination of both the facial image and the voice input, by the wearable device (112), the POS device (111), and the server device (150) as described above. Once the received facial image and/or voice input of the customer (120) are identified as associated with the customer profile (141), the payment credential (141d) is returned by the server device (150) to the POS device (111) to process the POS transaction for the customer (120). In one or more embodiments, the POS transaction is processed with additional authentication based on security data items (e.g., password, security code, etc.) provided by the customer (120) to the POS device (111).

In one or more embodiments, the server device (150) is provided by an application service provider, such as software as a service (SaaS) that is accessible by the merchant (110) on a subscription basis. In one or more embodiments, at least a portion of the server device (150) is integrated with the POS device (111).

FIGS. 2.1, 2.2, and 2.3 show a method flow chart in accordance with one or more embodiments of the invention. In one or more embodiments of the invention, the method of FIGS. 2.1, 2.2, and 2.3 may be practiced using the system (100) described in reference to FIG. 1 above. In one or more embodiments of the invention, one or more of the steps shown in FIGS. 2.1, 2.2, and 2.3 may be omitted, repeated, and/or performed in a different order than that shown in FIGS. 2.1, 2.2, and 2.3. Accordingly, the specific arrangement of steps shown in FIGS. 2.1, 2.2, and 2.3 should not be construed as limiting the scope of the invention.

Figure 21:
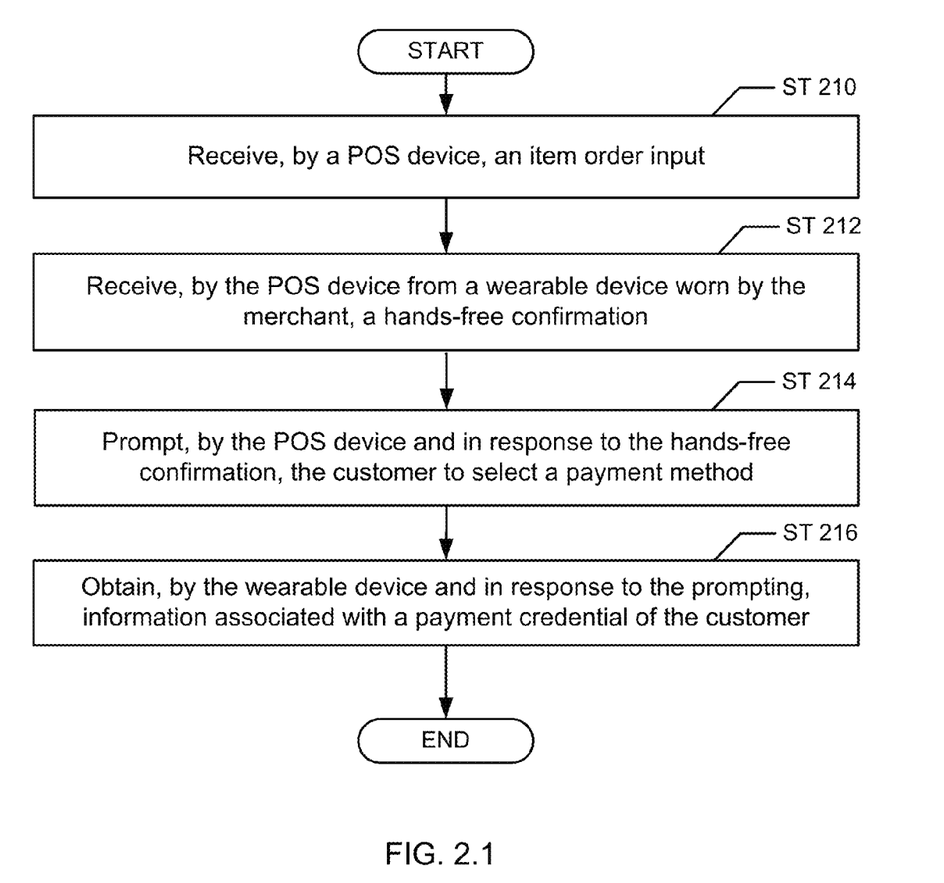

FIG. 2.1 shows a method for processing handsfree point-of-sale (POS) transaction. Initially in Step 210, an item order input is received by a POS device. The item order input specifies an item that is listed in a pre-determined inventory list of a merchant. In one or more embodiments, the item order input is initially received as a voice input from the merchant by a wearable device worn by the merchant. Subsequently, the item order input is sent to the POS device from the wearable device.

In Step 212, a hands-free confirmation is received by the POS device from the wearable device. The hands-free confirmation confirms that the item is to be purchased by a customer. In one or more embodiments, the hands-free confirmation is initially received as another voice input from the merchant by the wearable device. Subsequently, the hands-free confirmation is sent to the POS device from the wearable device.

In Step 214, in response to the hands-free confirmation, a prompt is presented by the POS device to the customer requesting the customer to select a payment method. In one or more embodiments, the prompt is a message displayed on the POS device.

Figure 22:
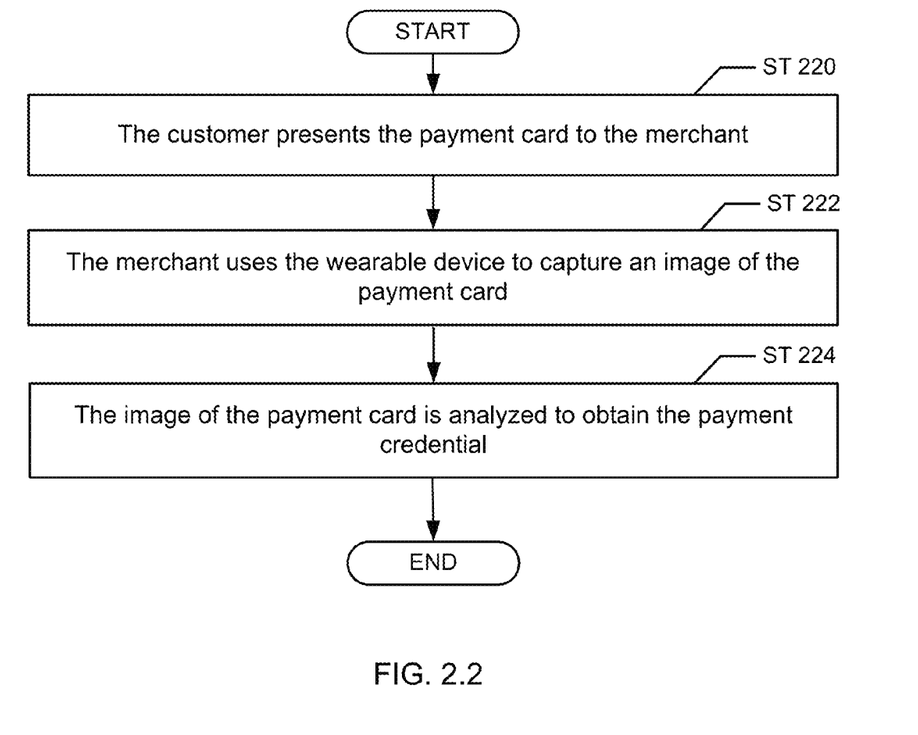
Figure 23:
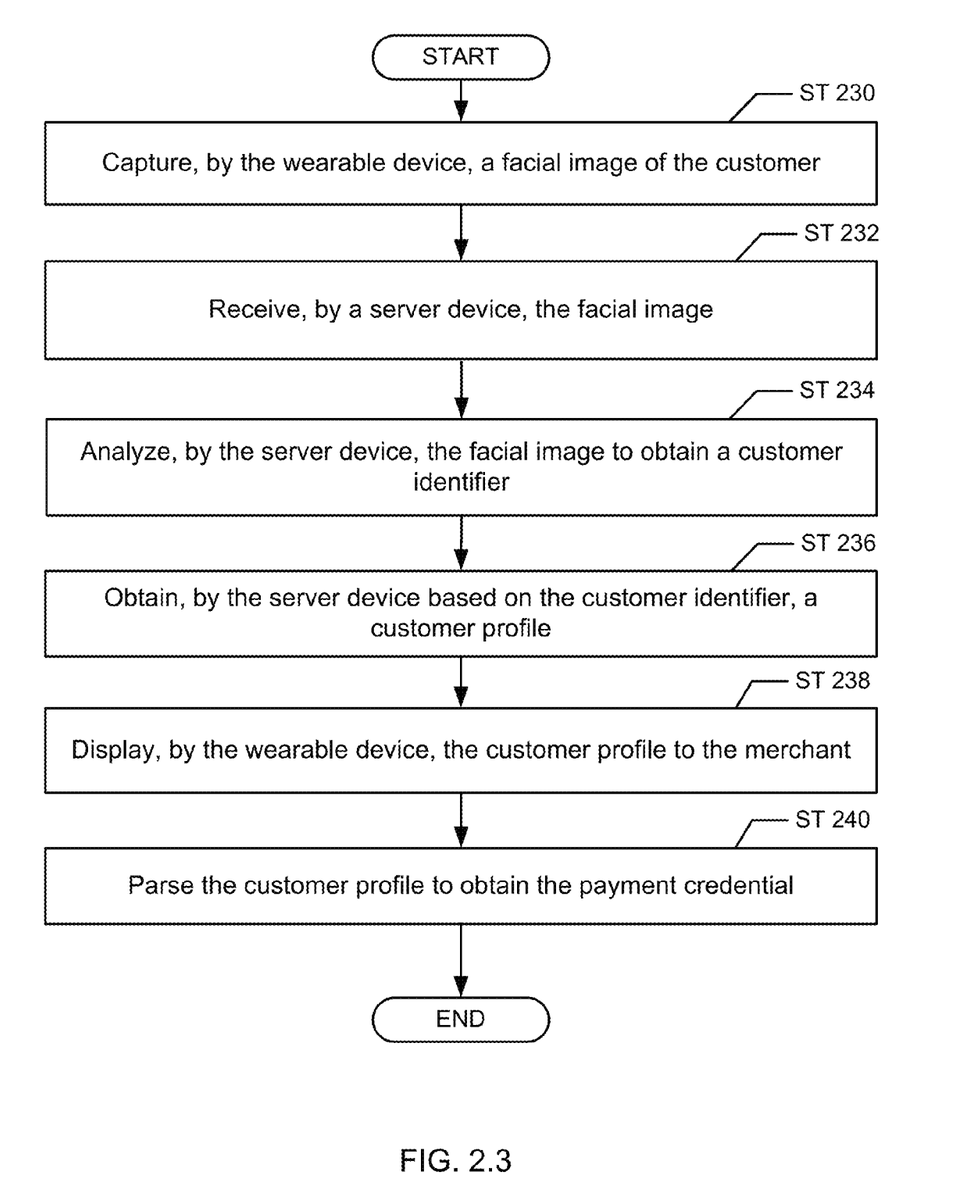

In Step 216, in response to the prompt, information associated with a payment credential of the consumer is obtained by the wearable device for sending to the POS device. In one or more embodiments, the payment credential is obtained based on a payment card of the customer using the method described in reference to FIG. 2.2 below. In one or more embodiments, the payment credential is obtained based on a facial image of the customer, using the method described in reference to FIG. 2.3 below. Accordingly, the POS transaction is performed based on the payment credential.

FIG. 2.2 shows additional details of the Step 216 depicted in FIG. 2.1 above. Specifically, FIG. 2.2 shows a method to obtain the payment credential from a payment card of the customer. Initially in Step 220, the customer chooses to pay for the transaction using a payment card, such as a credit card, debit card, etc. Specifically, the customer presents the payment card to the merchant in response to the prompt.

In Step 222, the merchant uses the wearable device to capture an image of the payment card. For example, the image may include the front side and the back side of the payment card. Subsequently, the image of the payment card is sent to the POS device from the wearable device.

In Step 224, the image of the payment card is analyzed to obtain the payment credential (e.g., the payment card number, expiration date, security code, etc.) for processing the POS transaction. In one or more embodiments, the payment credential is extracted from the image of the payment card using OCR techniques. In one or more embodiments, the payment credential is extracted by the POS device. In one or more embodiments, the POS device sends the image of the payment card to a server device for extracting the payment credential.

FIG. 2.3 shows additional details of the Step 216 depicted in FIG. 2.1 above. Specifically, FIG. 2.3 shows a method to obtain the payment credential from a customer profile of the customer. Initially in Step 230, a facial image of the customer is captured by the wearable device for sending to the POS device. In one or more embodiments, the facial image is captured using a built-in camera of the wearable device that is directed toward the customer by the merchant. In one or more embodiments, the facial image is in turn sent from the POS device to a server device that maintains a customer facial image database.

In Step 232, the facial image is received by the server device via the POS device. In one or more embodiments, the customer facial image database maintained by the server device is indexed by customer identifiers and includes facial images or facial image based signatures of customers.

In Step 234, the facial image is analyzed by the server device to obtain a customer identifier of the customer. In one or more embodiments, the facial image is analyzed to extract pre-determined facial features that are compared to a collection of facial images or facial image based signatures stored in the customer facial image database. Accordingly, the customer identifier of the customer is determined based on a comparison match.

In Step 236, a customer profile of the customer is obtained by the server device from a customer profile database based on the customer identifier. In one or more embodiments, the customer profile database is separate from the customer facial image database. In one or more embodiments, the customer profile database includes the customer facial image database.

In Step 238, the customer profile is sent to the wearable device (e.g., via the POS device) for displaying to the merchant.

In Step 240, the customer profile is parsed to obtain the payment credential. For example, the customer profile may includes information associated with a payment card of the customer, as well as other payment credential information, such as a mobile phone number and/or email address that uniquely identify an electronic wallet or electronic payment service account of the customer. In one or more embodiments, the payment credential obtained from the customer profile is used to process the transaction based on an authorization from the customer. Accordingly, the payment is processed without further obtaining the payment credential directly from the customer.

In one or more embodiments, the customer authorization is confirmed based on a security data item stored in the customer profile. For example, the customer may be prompted to provide a pin number and/or an answer of a security question that is matched to the pin number and security question/answer stored in the customer profile. The customer authorization may then be confirmed based on a match. Otherwise, an alert may be generated and presented to the merchant and/or the customer to prevent the payment from being processed using the payment credential. In another example, the customer's voice may be captured by the POS device or the wearable device and matched to a voice signature stored in the customer profile for the same purpose as the pin number or the security question. For example, the captured customer voice may be sent to the server device for analyzing and matching to the voice signature.

FIGS. 3.1, 3.2, 3.3, 3.4, and 3.5 show an example in accordance with one or more embodiments of the invention. In one or more embodiments, the example described herein may be practiced using the system (100) and the method flow chart described in reference to FIG. 1 and FIG. 2, respectively. Generally, the example described herein leverages wearable device hardware and built-in camera, such as Google Glass® (hereinafter "GG"), and uses a Glassware® (i.e., Google Glass® application) named "GlassPayment" to interface with a tablet computer based point-of-sale (POS) device. The GlassPayment application uses built in wireless antennas of the GG to communicate with the POS device, such as submitting a credit card image captured using the GG. The POS device extracts credit card information from the credit card image using OCR technology and initiates the transaction processing using an electronic payment network.

Figure 31:
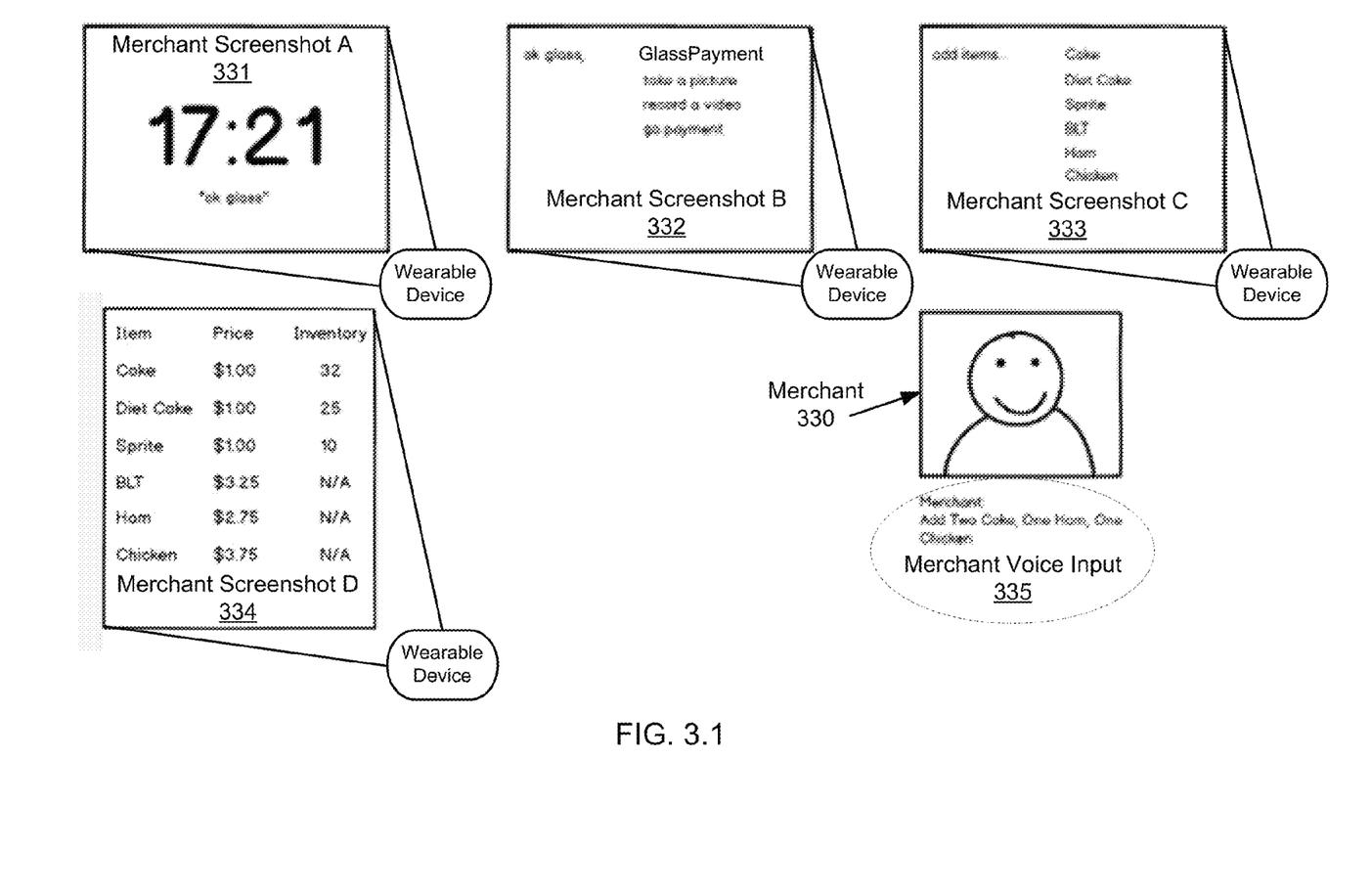
Figure 32:
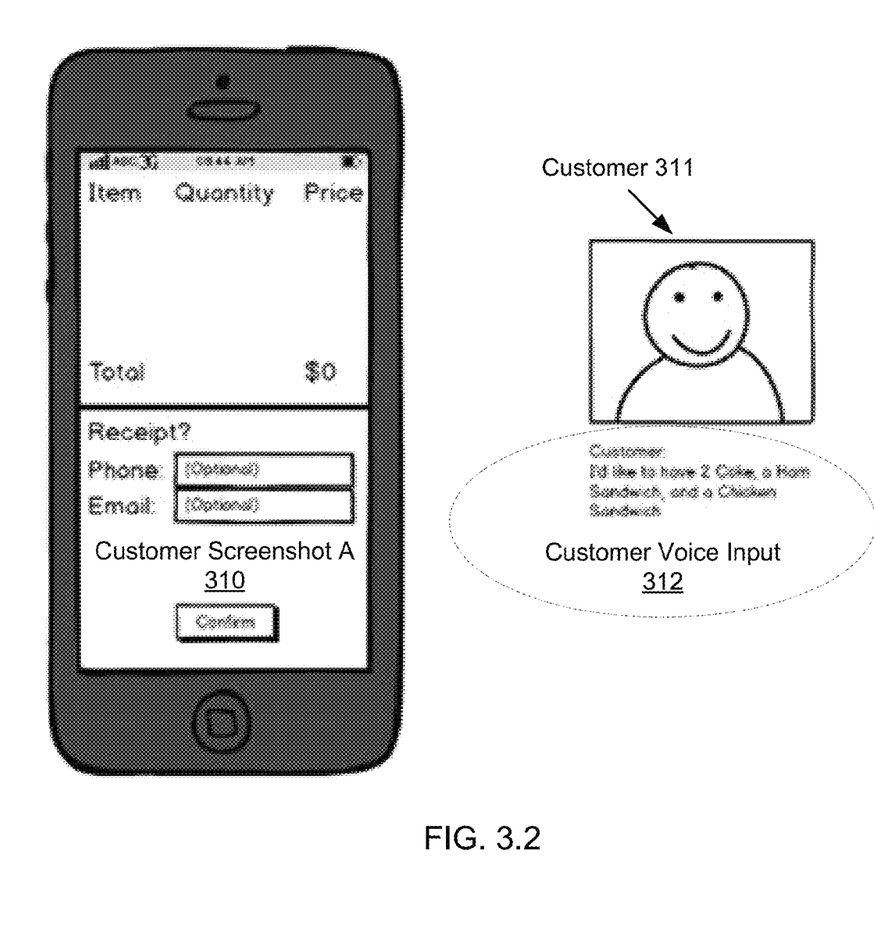

More specifically, a small business merchant (330) operating a food truck uses the GlassPayment to maintain a predefined inventory list that lists items offered and the associated prices. FIG. 3.1 shows a series of screenshots viewed by the merchant (330) from a wearable device (e.g., the GG) worn by the merchant. To store the inventory list in the GlassPayment, the merchant (330) activates GG by saying "Ok Glass" as shown in the merchant screenshot A (331). Once the GG is activated, the merchant (330) launches GlassPayment by saying "GlassPayment" as shown in the merchant screenshot B (332). Subsequently, the merchant (330) adds items into the inventory list by reading out aloud item names from his note, as shown in the merchant screenshot C (333). When all items are added, the merchant (330) says "inventory list" to view the generated inventory list with prices, as shown in the merchant screenshot D (334). Once the merchant (330) confirms this inventory list, the GlassPayment is ready to process a customer transaction. For example, the merchant (330) may generate and/or confirm a customer order by uttering the merchant voice input (335) that repeats a customer voice input (312) shown in FIG. 3.2 below.

FIG. 3.2 shows a customer (311) facing the customer screenshot A (310) presented to the customer (311) by the POS device installed on the food truck. Specifically, the customer screenshot A (310) shows an order template allowing the customer (311) to order a lunch from the food truck by uttering the customer voice input (312). In one example scenario, the customer voice input (312) is captured and processed by the POS device using speech recognition technique and causes the display on the POS device to switch from the customer screenshot A (310) to the customer screenshot B (320). Specifically, the customer screenshot B (320) shows the order template as filled-in using order information extracted from the customer voice input (312) by the POS device using the speech recognition technique. The order information shown in customer screenshot B (320) is also displayed in the GG worn by the merchant (330) who confirms the order by uttering the merchant voice input (335) (as shown in FIG. 3.1) to repeat the customer voice input (312).

Figure 34:
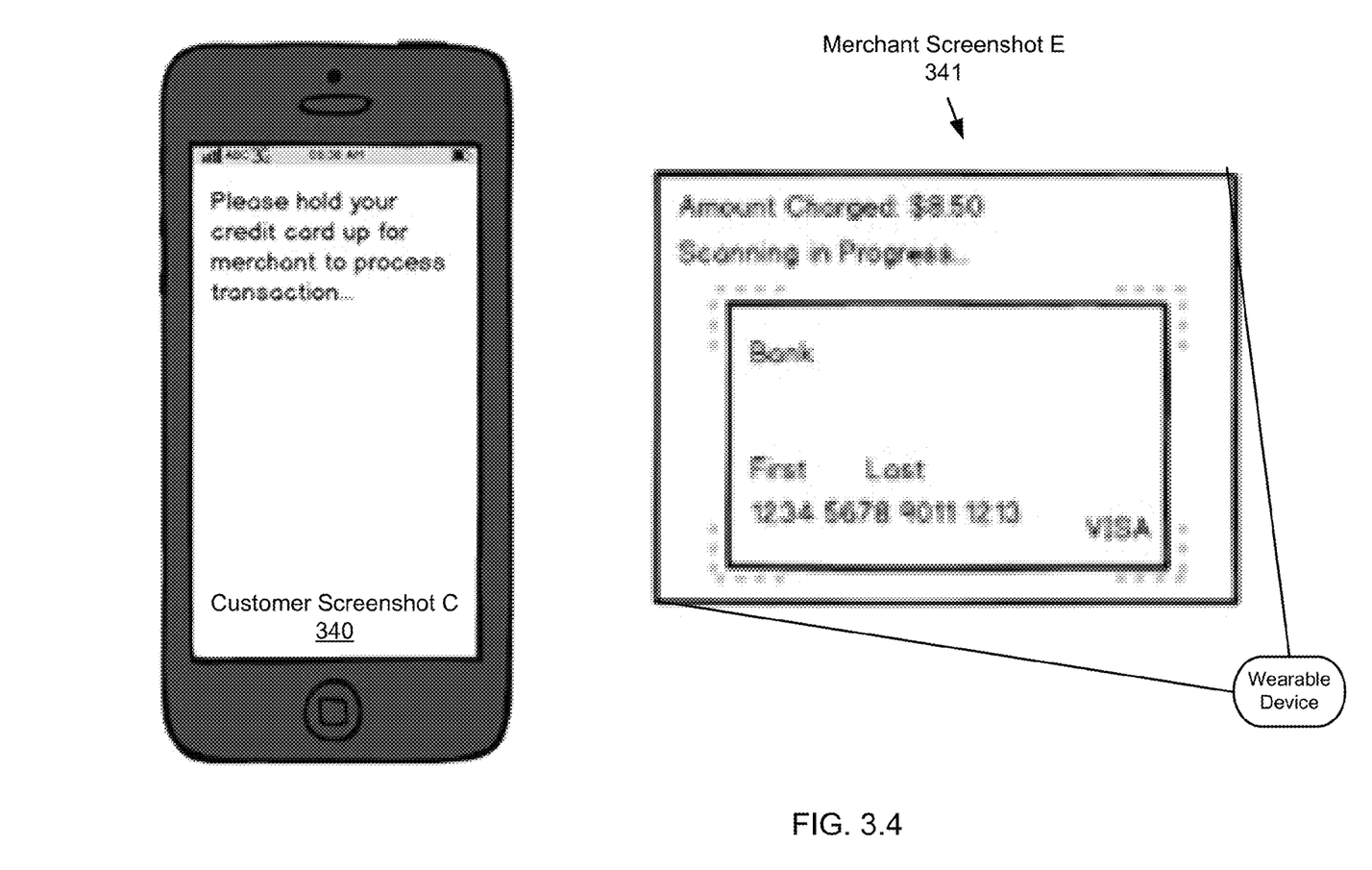
Figure 35:
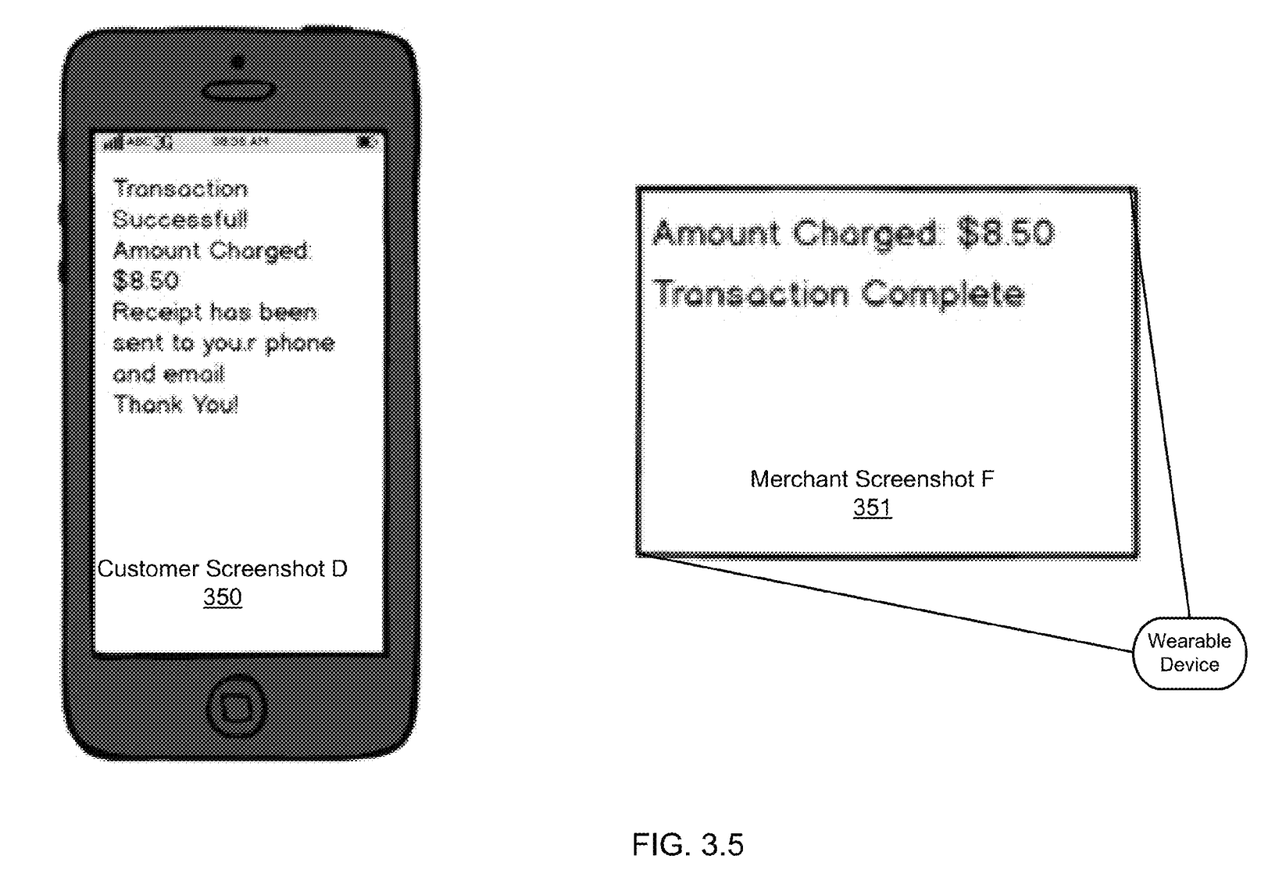

In case where the merchant (330) determines that the order information displayed in the GG contains an error (e.g., due to voice capture or speech recognition performed by the POS device), the merchant (330) may correct the error by way of the merchant voice input (335). The correction is also reflected in the order information displayed on the POS device (i.e., customer screenshot B (320)) where the customer (311) may proceed to confirm the order. Once the order is confirmed, the merchant (330) may verbally request the customer (311) raise his/her credit card for scanning using GG's built-in camera. At the same time, the same request may be displayed on the POS device in the customer screenshot C (340) shown in FIG. 3.4. The credit card image is then captured using GG's built-in camera (as shown in the merchant screenshot E (341) of FIG. 3.4) and transmitted to the POS device. Accordingly, the POS device extracts the credit card information using OCR technology to initiate processing of the transaction. Once the transaction is completed successfully, a transaction successful message is displayed on GG for viewing by the merchant (330) and displayed on the POS device for viewing by the customer (311).

In another example scenario, instead of the POS device directly capturing the customer voice input (312), the customer voice input (312) is heard by the merchant (330) who repeats the customer voice input (312) as the merchant voice input (335) to the GG. The GG in turn transmits the merchant voice input (335) to the POS device that extracts the order information using a speech recognition technique and displays the filled-in order template as the customer screenshot B (320).

Figure 33:
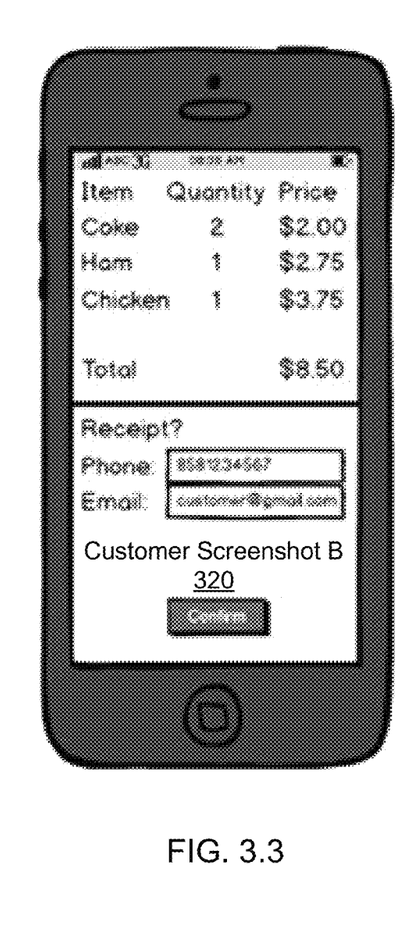

In yet another example scenario, instead of requesting the customer (311) to use credit card for payment, the merchant (330) may direct the GG's built-in camera toward the customer (311) to capture a facial image for transmitting to the POS device. The POS device then routes the facial image to a backend server that maintains a customer profile database and has the capability to identify the customer profile of the customer (311) based on the facial image. Accordingly, a mobile phone number and/or an email address of the customer (311) is retrieved from the customer profile and sent back to the POS device. The POS device displays the retrieved mobile phone number and/or email address of the customer (311), as shown in the customer screenshot B (320) of FIG. 3.3. In addition, other customer information (e.g., frequently purchased items, favorite sport teams, loyal customer discount, etc.) may also be retrieved from the customer profile and sent to the GG via the POS device. Having the benefit of viewing such personal information of the customer (311) using GG, the merchant (330) may advantageously greet the customer (311) or extend loyalty discount during the ordering/transaction processing activity to enhance customer loyalty from the customer (311).

The customer (311) may chose to use an electronic wallet or an electronic payment service account to pay for the lunch order. Specifically, the electronic wallet or the payment service account is uniquely identified using the mobile phone number and/or the email address of the customer (311). Such electronic wallet or the payment service account payment is further authenticated based on a voice signature extracted from the customer voice input (312) or other authentication credential (e.g., password, pin number, security question/answer, etc.) provided by the customer (312).

Figure 4:
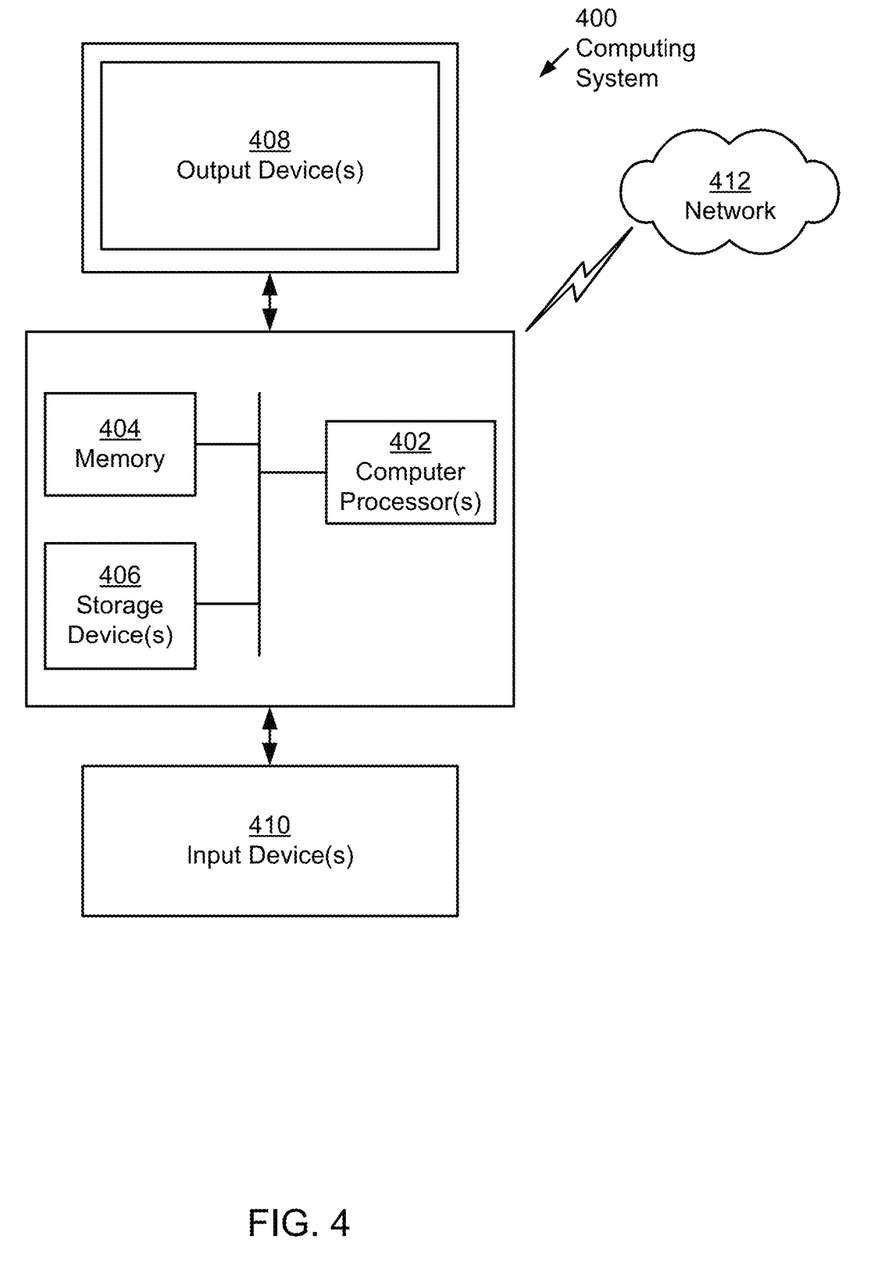
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, smart watch, a wearable device, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for performing a point-of-sale (POS) transaction, comprising:
   a POS device configured to:
      receive, from a customer voice input device, a customer voice input to place an item order, wherein the item order specifies an item that is listed in a pre-determined inventory list of a merchant,
      send the item order to a wearable hardware device worn by the merchant,
      receive, in response to sending the item order to the wearable hardware device, a hands-free confirmation by the merchant confirming receipt of the item order using the wearable hardware device, and
      prompt, in response to the hands-free confirmation by the merchant, a customer to select a payment method; and
   the wearable hardware device worn by the merchant and separate from the customer voice input device, wherein the wearable hardware device is configured to:
      display, to the merchant and in response to the POS device receiving the customer voice input, the item order, receive, from the merchant and in response to displaying the item order, a merchant voice input comprising the hands-free confirmation by the merchant for sending to the POS device, and obtain, in response to the prompting, information associated with a payment credential of the consumer for sending to the POS device, wherein the POS transaction is performed based on the payment credential.

2. The system of claim 1, wherein the wearable hardware device is further configured to:

capture, in response to the prompting, an image of a payment card presented by the customer, wherein the information associated with the payment credential comprises the image of the payment card, wherein the system further comprises a server device configured to:

receive the image of the payment card via the POS device; and analyze the image of the payment card to obtain the payment credential for processing the POS transaction.

3. The system of claim 1, wherein the wearable hardware device is further configured to:

capture a facial image of the customer for sending to the POS device, wherein the system further comprises a server device configured to:

receive the facial image via the POS device;

analyze the facial image to obtain a customer identifier of the customer; and obtain, based on the customer identifier, a customer profile of the customer from a customer profile database, and wherein the wearable hardware device is further configured to display the customer profile to the merchant.

4. The system of claim 3, wherein the POS device is configured to:

parse the customer profile to obtain the payment credential; and receive, from the customer, an authorization to process the payment without further obtaining the payment credential directly from the customer.

5. The system of claim 4, wherein the POS device is configured to:

confirm the authorization based on a security data item stored in the customer profile, wherein the security data item comprises at least one selected from a group consisting of a personal identification number (PIN) number, a security question, and a voice signature.

6. The system of claim 5, wherein the POS device is configured to capture a voice utterance of the customer for sending to the server device, wherein the server device is further configured to analyze the voice utterance and the voice signature to determine a match, and wherein the authorization is confirmed based on the match.

7. A method for performing a point-of-sale (POS) transaction, comprising:

receiving, by a POS device and from a customer voice input device, a customer voice input to place an item order, wherein the item order specifies an item that is listed in a pre-determined inventory list of a merchant;

sending, by the POS device, the item order to a wearable hardware device worn by the merchant and separate from the customer voice input device;

displaying, by the wearable hardware device to the merchant and in response to the POS device receiving the customer voice input, the item order;

receiving, by the wearable hardware device from the merchant and in response to displaying the item order, a merchant voice input comprising a hands-free confirmation by the merchant for sending to the POS device, wherein the hands-free confirmation confirms that the item is to be purchased by a customer;

prompting, by the POS device and in response to the hands-free confirmation by the merchant, the customer to select a payment method; and obtaining, by the wearable hardware device and in response to the prompting, information associated with a payment credential of the consumer for sending to the POS device, wherein the POS transaction is performed based on the payment credential.

8. The method of claim 7, further comprising:

capturing, by the wearable hardware device in response to the prompting, an image of a payment card presented by the customer, wherein the information associated with the payment credential comprises the image of the payment card;

receiving, by a server device, the image of the payment card via the POS device; and analyzing, by the server device, the image of the payment card to obtain the payment credential for processing the POS transaction.

9. The method of claim 7, further comprising:

capturing, by the wearable hardware device, a facial image of the customer for sending to the POS device;

receiving, by a server device, the facial image via the POS device;

analyzing, by the server device, the facial image to obtain a customer identifier of the customer; and obtaining, by the server device based on the customer identifier, a customer profile of the customer from a customer profile database, displaying, by the wearable hardware device, the customer profile to the merchant.

10. The method of claim 9, further comprising:

parsing the customer profile to obtain the payment credential; and receiving, from the customer, an authorization to process the payment without further obtaining the payment credential directly from the customer.

11. The method of claim 10, further comprising:

confirming the authorization based on a security data item stored in the customer profile, wherein the security data item comprises at least one selected from a group consisting of a personal identification number (PIN) number, a security question, and a voice signature.

12. The method of claim 11, further comprising:

capturing, by the POS device, a voice utterance of the customer for sending to the server device; and further analyzing, by the server device, the voice utterance and the voice signature to determine a match, wherein the authorization is confirmed based on the match.

13. A non-transitory computer readable medium storing instructions for performing a point-of-sale (POS) transaction, the instructions, when executed by a computer processor, comprising functionality for:

receiving, by a POS device and from a customer voice input device, a customer voice input to place an item order, wherein the item order specifies an item that is listed in a pre-determined inventory list of a merchant;

sending, by the POS device, the item order to a wearable hardware device worn by the merchant and separate from the customer voice input device;

displaying, by the wearable hardware device to the merchant and in response to the POS device receiving the customer voice input, the item order;

receiving, by the wearable hardware device from the merchant and in response to displaying the item order, a merchant voice input comprising a hands-free confirmation by the merchant for sending to the POS device, wherein the hands-free confirmation confirms that the item is to be purchased by a customer;

prompting, by the POS device and in response to the hands-free confirmation by the merchant, the customer to select a payment method; and obtaining, by the wearable hardware device and in response to the prompting, information associated with a payment credential of the consumer for sending to the POS device, wherein the POS transaction is performed based on the payment credential.

14. The non-transitory computer readable medium of claim 13, wherein the instructions, when executed by a computer processor, further comprising functionality for:

capturing, by the wearable hardware device in response to the prompting, an image of a payment card presented by the customer, wherein the information associated with the payment credential comprises the image of the payment card;

receiving, by a server device, the image of the payment card via the POS device; and analyzing, by the server device, the image of the payment card to obtain the payment credential for processing the POS transaction.

15. The non-transitory computer readable medium of claim 13, wherein the instructions, when executed by a computer processor, further comprising functionality for:

capturing, by the wearable hardware device, a facial image of the customer for sending to the POS device;

receiving, by a server device, the facial image via the POS device;

analyzing, by the server device, the facial image to obtain a customer identifier of the customer; and obtaining, by the server device based on the customer identifier, a customer profile of the customer from a customer profile database, displaying, by the wearable hardware device, the customer profile to the merchant.

16. The non-transitory computer readable medium of claim 15, further comprising:

parsing the customer profile to obtain the payment credential; and receiving, from the customer, an authorization to process the payment without further obtaining the payment credential directly from the customer.

17. The non-transitory computer readable medium of claim 16, further comprising:

confirming the authorization based on a security data item stored in the customer profile, wherein the security data item comprises at least one selected from a group consisting of a personal identification number (PIN) number, a security question, and a voice signature.

* * * * *